Nov. 23, 1965  G. E. RADCLIFFE  3,219,236
SYSTEM FOR DISPENSING CARBONATED BEVERAGES
Filed Aug. 6, 1962

INVENTOR.
GEORGE E. RADCLIFFE
BY Pearce and Schaeperklaus
Attorneys.

3,219,236
SYSTEM FOR DISPENSING CARBONATED BEVERAGES
George E. Radcliffe, Cincinnati, Ohio, assignor to The Coca-Cola Bottling Works Company, Cincinnati, Ohio, a corporation of Ohio
Filed Aug. 6, 1962, Ser. No. 215,043
13 Claims. (Cl. 222—52)

This invention relates to devices for dispensing carbonated beverages and the like.

Carbonated beverages for use in dispensers and the like are supplied in large containers or tanks holding a number of pre-mixed portions or servings thereof. The pressure or carbonation in such tanks is not sufficient alone to discharge the beverage from a container without reducing the carbon dioxide content of the beverage below desirable levels. An object of this invention is to provide a system for dispensing a pre-mixed carbonated beverage from a container by use of a propellent fluid without pick-up or loss of carbonation thereof.

As a propellent, I employ carbon dioxide from a cylinder containing liquid and gaseous carbon dioxide. Carbon dioxide propellent gas from the cylinder is introduced into the beverage container to maintain the pressure of carbonation in the beverage. The pressure of the carbon dioxide propellent has to be reduced before use, and a further object of this invention is to provide such a system which employs a pressure reducing and regulating valve which reduces the pressure of the propellent to a sufficient value to keep proper carbonation in the beverage and to deliver the beverage when wanted.

A carbonated beverage, to have the proper flavor and other characteristics, requires a predetermined degree of cabonation. As the temperature of the beverage changes, the pressure of carbon dioxide required over the beverage to maintain the predetermined degree of carbonation varies.

A further object of this invention is to provide a system in which the pressure of the propellent fluid is varied or regulated as the temperature changes to provide such a pressure of carbon dioxide over the beverage that the predetermined degree of carbonation is maintained automatically notwithstanding variations in temperature.

A further object of this invention is to provide a system of this type in which the pressure at which the propellant fluid is admitted to the beverage is controlled by a control container or tank in which there is a standard water-carbon dioxide mixture and in which means is provided for connecting the control tank to the regulator valve in such a manner that introduction of the propellent fluid to the beverage is permitted when the pressure over the beverage falls below that in the control tank, the pressure in the beverage container being maintained at the pressure in the control tank.

A further object of this invention is to provide a system of this type in which means is provided for varying the pressure at which the regulator valve admits propellent fluid to the beverage to compensate for additional pressure necessary to overcome line losses and the like.

A further object of this invention is to provide such a system in which an amount of a gas which is substantially insoluble in water is added to the control tank in sufficient amount to compensate for losses required for delivery of the beverage from the beverage container to a dispensing valve such as line losses and the like.

A further object of this invention is to provide such a system in which mechanical means is provided to cause the regulator valve to admit propellent fluid to compensate for the additional pressure necessary to overcome line losses and the like.

The above and other objects and features of the invention will be apparent to those skilled in the art to which this invention pertains from the following detailed description and the drawing, in which.

In the following detailed description, and the drawing, like reference characters indicate like parts.

Figure 1:
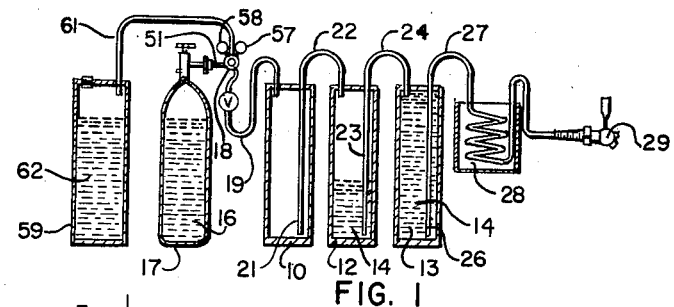
FIG. 1 is a somewhat schematic sectional view showing a system for delivering carbonated beverages constructed in accordance with an embodiment of this invention.

In FIG. 1 is shown schematically a system for dispensing beverages constructed in accordance with an embodiment of the invention. The system includes a plurality of pressure beverage tanks 10, 12, and 13. The tank 13 is shown full of beverage 14, and the tank 12 is shown partly full of beverage. Pressure of carbon dioxide propellent 16 in a cylinder 17 is transmitted through a pressure reducing and regulating valve 18 and a line 19 to the top of the tank 10. A dip tube 21 and a jumper line 22 connect the interior of the tank 10 with the upper portion of the tank 12. Liquid beverage in the tank 12 can pass through a dip tube 23 and a jumper line 24 to the upper portion of the tank 13. Liquid beverage in the tank 13 can pass through a dip tube 26 and a jumper line 27 to the interior of a cooler 28 in which the beverage is cooled by ice or the like to an appropriate temperature for dispensing through a dispensing valve 29.

Figure 2:
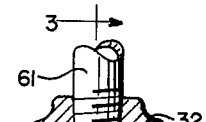
FIG. 2 is a view in transverse section of a pressure reducing and regulating valve which forms a part of the system illustrated in FIG. 1.
Figure 3:
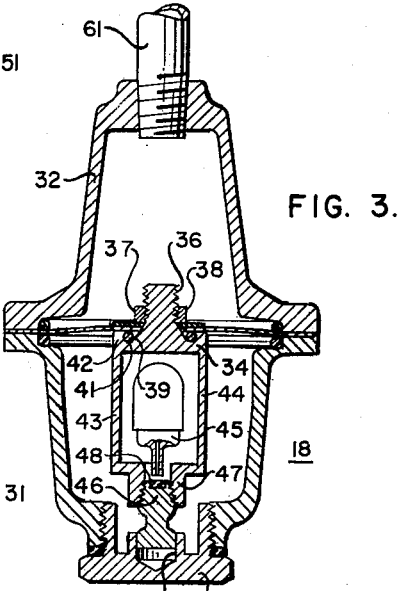
FIG. 3 is a view in section taken on the line 3–3 in FIG. 2.

Details of construction of the pressure reducing and regulating valve 18 are shown in FIGS. 2 and 3. The valve 18 includes a hollow body 31 and a hollow cap 32 between which a diaphragm 33 is mounted. A yoke 34 is attached to the diaphragm 33. The yoke 34 includes a threaded portion 36 which extends through a central opening 37 (FIG. 3) in the diaphragm 33. A nut 38 threaded on the portion 36 holds the diaphragm in engagement with a circular gasket or O-ring 39. The gasket 39 is received in a circular groove 41 in a head portion 42 of the yoke 34. From the head portion 42 arms 43 and 44 extend downwardly on opposite sides of an inlet nozzle 45. At the lower ends of the arms 43 and 44 is mounted a plug 46. The plug 46 is mounted in a lower ring portion 47 of the yoke 34. The plug 46 carries a valve disc 48 engageable with the nozzle 45 to close the nozzle when the diaphragm and yoke are raised to the position shown in FIG. 3. The lower end of the plug 46 is received in a socket 49 in a lower closure member 50 to guide the yoke as the yoke reciprocates up and down when the diaphragm 33 flexes.

Propellent fluid (carbon dioxide) under pressure enters the interior of the hollow body 31 through an inlet line 51 (FIG. 2) in communication with the nozzle 45 through an inlet passageway 52 in the body 31. As long as the pressure inside the hollow cap 32 is sufficiently greater than that inside the hollow body 31, the yoke is held in the position of FIG. 3 in which the valve is open. However, when the pressure inside the body 31 becomes greater than inside the interior of the hollow cap 32, the diaphragm rises to the position of FIG. 2 and the valve is closed. Openings 54 and 56 in the hollow body 31 and in the inlet passageway 52, respectively, are provided. Pressure gauges 57 and 58 (FIG. 1) are respectively connected to openings 56 and 54 to show respectively the pressure of the propellent fluid in passage 52 and the pressure at which the propellent fluid is being introduced into the beverage containers from adjacent opening 54.

The interior of the hollow cap 32 (FIGS. 2 and 3) communicates with the interior of a regulator or control tank 59 (FIG. 1) through a line 61 so that the pressure inside the interior of the hollow cap 32 is determined by the pressure inside the regulator tank 59. Inside the regulator or control tank 59 is placed a supply of carbonated water or the like 62, containing the same degree of carbonation which is desired in the beverage to be delivered. As the temperature of the various containers increases, the pressure developed in the control tank increases to a value sufficient that the appropriate degree of carbonation is maintained in the beverage containers. In addition, means can be provided for permitting the regulator valve to open and admit additional propellent fluid to overcome line losses caused in delivery of the beverage. A sufficient amount of a gas which is substantially insoluble in the carbonated water, such as nitrogen, is introduced into the control tank. Thus, the nitrogen or the like supplies a sufficient partial pressure to provide the pressure required to compensate for line losses and the like as the beverage passes through various lines from the beverage tanks to the dispensing valve and the carbon dioxide of the carbonated water in the control tank 59 provides a sufficient partial pressure to retain the desired degree of carbonation in the beverage. The insoluble gas provides a substantially constant partial pressure in the control tank 59 varying only a small amount with normal variations in temperature so that, regardless of the temperature, an appropriate partial pressure of the insoluble gas is supplied to overcome line losses, and the partial pressure of the carbon dioxide provides the degree of pressure required to maintain the appropriate degree of carbonation in the beverage, the partial pressure of the carbon dioxide varying as the temperature of the control tank varies. In addition, the insoluble gas is preferably one, such as nitrogen, which remains a gas at temperatures which are attained in the regulator valve so that, even if the temperature in the regulator valve is greatly reduced during delivery of propellent fluid therethrough, the insoluble gas remains in the gaseous state and resists or prevents condensing in the regulator valve which could affect the operation thereof.

Figure 4:
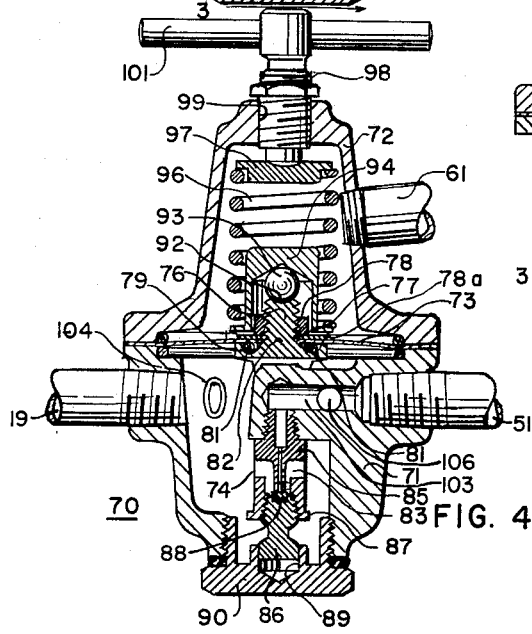
FIG. 4 is a view in transverse section of a pressure reducing and regulating valve which forms a part of a system constructed in accordance with another embodiment of this invention.

In FIG. 4 is shown a pressure reducing and regulating valve 70 forming a portion of a beverage dispensing system constructed in accordance with another embodiment of this invention. The valve 70 can be substituted in the system shown in FIG. 1 for the valve 18, and other parts of the system can be as shown in FIG. 1.

The valve 70 includes a hollow body 71 and a hollow cap 72 between which a diaphragm 73 is mounted. A yoke 74 is attached to the diaphragm 73. The yoke 74 includes a threaded neck 76 which extends through an opening 77 in the diaphragm 73. A nut 78 threaded thereon holds a washer 78a against the diaphragm to hold the diaphragm against a circular gasket or O-ring 79. The gasket 79 is received in a circular groove 81 in a head portion 82 of the yoke 74. From the head portion 82, arms 83 (only one of which is shown) extend downwardly on opposite sides of an inlet nozzle 85. At the lower ends of the arms 83 is mounted a plug 86. The plug 86 is mounted in a lower ring portion 87 of the yoke 74. The plug 86 carries a valve disc 88 engageable with the nozzle 85 to close the nozzle when the diaphragm and yoke are in the raised position shown in FIG. 4. The lower end of the plug 86 is received in a socket 89 in a lower closure member 90 which guides the yoke as the yoke reciprocates up and down with the diaphragm 73.

The upper end of the yoke 74 is provided with a socket 92 in which a ball 93 is received. The ball 93 supports a spring rest 94. A compression spring 96 is mounted between the spring rest 94 and another spring rest 97. The spring rest 97 is engaged by an end of a bolt 98 which extends through a bore 99 in the cap 72. The bolt 98 can be turned by means of a handle 101 to vary the spring load on the diaphragm. In addition, the line 61 from the regulator or control tank 59 (FIG. 1) communicates with the interior of the cap (see FIG. 4) so that the load on the diaphragm includes both the load of the spring and the pressure in the regulator and control tank.

Propellent fluid (carbon dioxide) under pressure enters the interior of the hollow body 71 from inlet line 51 in communication with the nozzle 85, through an inlet passageway 103 in the body 71. As long as the sum of the pressure inside the hollow cap 72 and the spring load is sufficiently greater than that inside the hollow body 71, the yoke is held open. However, when the pressure inside of the body 71 becomes greater than this sum, the diaphragm raises to the position shown in FIG. 4 and the valve is closed. The inlet line 51 receives carbon dioxide from the storage cylinder 17 (see FIG. 1) and outlet line 19 receives the carbon dioxide to direct it to the beverage containers 10, 12 and 13.

Openings 104 and 106 in the hollow body 71 in the inlet passageway 103, respectively, are provided. The pressure gauges 57 and 58 (FIG. 1) are connected to openings 106 and 104 to show respectively the pressure of the propellent fluid in passage 103 and the pressure at which the propellent fluid is being introduced into the beverage containers from adjacent opening 104.

In the system using the valve shown in FIG. 4, the spring pressure can be set at a sufficient value to compensate for line losses and the like. The regulator or control tank 59 is filled with a carbonated beverage having the desired degree of carbonation, and the inert gas referred to in connection with the first embodiment of this invention can be omitted, the spring pressure supplying a sufficient load on the diaphragm to permit delivery of carbon dioxide to the beverage containers at a sufficient pressure above that of preferred carbonation to compensate for line losses.

The system illustrated in the drawing and described above is subject to structural modification without departing from the spirit and scope of the appended claims.

Having described my invention, what I claim as new and desire to secure by Letters Patent, is:

1. A system for dispensing a carbonated beverage which comprises a container for holding the carbonated beverage, means for dispensing the carbonated beverage from the container, a tank for carbonate dioxide under pressure, means connecting the tank to the container to supply carbon dioxide under pressure in contact with the beverage in the container, a regulator valve in the connecting means, a control tank connected to the regulator valve, the regulator valve being arranged to open when the pressure in the control tank is greater than that in the beverage container, a liquid containing a predetermined degree of carbonation in the control tank to provide a partial pressure of carbon dioxide therein, and a partial pressure in the control tank of a substantially insoluble gas, the regulator valve maintaining the pressure in the beverage container substantially equal to that in the control tank, the partial pressure of carbon dioxide in the control tank being sufficient to maintain a predetermined degree of carbonation in the beverage, the partial pressure of the insoluble gas supplying a partial pressure in the beverage tank sufficient to overcome pressure losses incident to delivery of the beverage.

2. A system for dispensing a carbonated beverage which comprises a container for holding the carbonated beverage, means for dispensing the carbonated beverage from the container, a tank of carbon dioxide under pressure, means connecting the tank to the container to supply carbon dioxide under pressure in contact with the beverage in the container, a regulator valve in the connecting means, a control tank connected to the regulator valve, the regulator valve being arranged to open when the pressure in the control tank is greater than that in the beverage container, and a liquid containing a predetermined degree of carbonation in the control tank to provide a pressure of carbon dioxide therein, the regulator valve maintaining the pressure in the beverage container substantially equal to that in the control tank.

3. A system for dispensing a carbonated beverage which comprises a container for holding the carbonated beverage, means for dispensing the carbonated beverage from the container, a tank of fluid under pressure, means connecting the tank to the container to supply fluid under pressure to the container, a regulator valve in the connecting means, a control tank connected to the regulator valve, the regulator valve being arranged to open when the pressure in the control tank is greater than that in the beverage container, and a liquid containing a predetermined degree of carbonation in the control tank to provide a pressure of carbon dioxide therein, the regulator valve maintaining the pressure in the beverage container substantially equal to that in the control tank.

4. A system for dispensing a carbonated beverage which comprises a container for holding the carbonated beverage, means for dispensing the carbonated beverage from the container, a tank of carbon dioxide under pressure, means connecting the tank to the container to supply carbon dioxide under pressure in contact with the beverage in the container, a regulator valve in the connecting means, a control tank connected to the regulator valve, the regulator valve being arranged to open when the pressure in the control tank is greater than that in the beverage container, a liquid containing a predetermined degree of carbonation in the control tank to provide a partial pressure of carbon dioxide therein, and nitrogen providing a partial pressure in the control tank, the regulator valve maintaining the pressure in the beverage container substantially equal to that in the control tank, the partial pressure of carbon dioxide in the control tank being sufficient to maintain a predetermined degree of carbonation in the beverage, the partial pressure of the nitrogen being sufficient to supply a partial pressure in the beverage tank sufficient to overcome pressure losses incident to delivery of the beverage.

5. A control valve which comprises a hollow body, a hollow cap, a diaphragm between the cap and the body, a valve means for introducing fluid under pressure into the body, a control tank, means for connecting the interior of the hollow cap to the interior of the control tank, a liquid in the control tank containing a predetermined degree of carbonation, means connecting the diaphragm to the valve means and arranged to open the valve means when the pressure in the cap exceeds the pressure in the body, and means for connecting the body to a beverage container to maintain a pressure on a beverage in the beverage container substantially equal to the pressure in the control tank.

6. A control valve for a beverage dispensing system which comprises a hollow body, a hollow cap, a diaphragm between the cap and the body, a valve means for introducing carbon dioxide under pressure into the body, a control tank, means for connecting the interior of the hollow cap to the interior of the control tank, a liquid in the control tank containing a predetermined degree of carbonation, means connecting the diaphragm to the valve means and arranged to open the valve means when the pressure in the cap exceeds the pressure in the body, and means for connecting the body to the beverage container to maintain a pressure of carbon dioxide on a beverage in the beverage container substantially equal to the pressure in the control tank.

7. A system for dispensing a carbonated beverage which comprises a container for holding the carbonated beverage, means for dispensing the carbonated beverage from the container, a tank of carbon dioxide under pressure, means connecting the tank to the container to supply carbon dioxide in contact with the beverage in the container, a regulator valve in the connecting means, a control tank connected to the regulator valve, the regulator valve being arranged to open when the pressure in the beverage container falls below a predetermined amount greater than that in the control tank, and a liquid containing a predetermined degree of carbonation in the control tank to provide a pressure of carbon dioxide therein.

8. A system for dispensing a carbonated beverage which comprises a container for holding the carbonated beverage, means for dispensing the carbonated beverage from the container, a tank of fluid under pressure, means connecting the tank to the container to supply fluid pressure to the container, a regulator valve in the connecting means, a control tank connected to the regulator valve, the regular valve being arranged to open when the pressure in the beverage container falls below a predetermined amount greater than that in the control tank, and a liquid containing a predetermined degree of carbonation in the control tank to provide a pressure of carbon dioxide therein.

9. A control valve which comprises a hollow body, a hollow cap, a diaphragm between the cap and the body, a valve means for introducing fluid under pressure into the body, means for imposing a predetermined load on the diaphragm, a control tank, means for connecting the interior of the hollow cap to the interior of the control tank, a liquid in the control tank containing a predetermined degree of carbonation, means connecting the diaphragm to the valve means and arranged to open the valve means when the sum of the predetermined load and the pressure in the cap exceeds the pressure in the body, and means for connecting the body to a beverage container.

10. A control valve for a beverage dispensing system which comprises a hollow body, a hollow cap, a diaphragm between the cap and the body, a valve means for introducing carbon dioxide under pressure into the body, spring means for imposing a predetermined load on the diaphragm, a control tank, means for connecting the interior of the hollow cap to the interior of the control tank, a liquid in the control tank containing a predetermined degree of carbonation, means connecting the diaphragm to the valve means and arranged to open the valve means when the sum of the predetermined load and the pressure in the cap exceeds the pressure in the body, and means for connecting the body to the beverage container.

11. A control valve for a beverage dispensing system which comprises a hollow body, a hollow cap, a diaphragm between the cap and the body, a valve means for introducing carbon dioxide under pressure into the body, a control tank, means for connecting the interior of the hollow cap to the interior of the control tank, a liquid in the control tank containing a predetermined degree of carbonation, means connecting the diaphragm to the valve means and arranged to open the valve means when the pressure in the body falls by a predetermined degree below the pressure in the cap, and means for connecting the body to the beverage container.

12. A system for dispensing a carbonated beverage which comprises a container for holding the carbonated beverage, means for dispensing the carbonated beverage from the container, a tank of carbon dioxide under pressure, means connecting the tank to the container to supply carbon dioxide in contact with the beverage in the container, a regulator valve in the connecting means, a control tank connected to the regulator valve, the regulator valve being arranged to open when the pressure in the control tank is greater than that in the beverage container, a liquid containing a predetermined degree of carbonation in the control tank to provide a partial pressure of carbon dioxide therein, and a substantially water-insoluble gas to provide a partial pressure in the control tank, the regulator valve maintaining the pressure in the beverage container substantially equal to that in the control tank, the partial pressure of carbon dioxide in the control tank being sufficient to maintain a predetermined degree of carbonation in the beverage, the partial pressure of the water-insoluble gas being sufficient to supply a partial pressure in the beverage tank sufficient to overcome pressure losses incident to delivery of the beverage.

13. A system for dispensing a carbonated beverage which comprises a container for holding the carbonated beverage, means for dispensing the carbonated beverage from the container, a tank of carbon dioxide under pressure, means connecting the tank to the container to supply carbon dioxide in contact with the beverage in the container, a regulator valve in the connecting means, said regulator valve including a diaphragm and valve means attached to and actuated by the diaphragm, one side of the diaphragm being exposed to carbon dioxide as it is delivered by the regulator valve to the beverage container, a control tank connected to the regulator valve on the other side of the diaphragm, means for imposing a predetermined substantially constant load on the diaphragm, and a liquid containing a predetermined degree of carbonation in the control tank to provide a pressure of carbon dioxide on said other side of the diaphragm, the diaphragm opening the valve when the sum of the predetermined substantially constant load on the diaphragm and the pressure of carbon dioxide in the control tank on the diaphragm exceeds the pressure on said one side of the diaphragm.

References Cited by the Examiner
UNITED STATES PATENTS

| | | | |
|---|---|---|---|
| 575,932 | 1/1897 | Nageldinger | 222—399 |
| 2,085,956 | 7/1937 | Clarke et al. | 222—399 X |
| 2,599,956 | 6/1952 | Wallace et al. | 137—505.44 |
| 3,006,515 | 10/1961 | Midnight | 222—399 X |

EVERETT W. KIRBY, *Primary Examiner.*

LAVERNE D. GEIGER, RAPHAEL M. LUPO,
*Examiners.*

UNITED STATES PATENT OFFICE
CERTIFICATE OF CORRECTION

Patent No. 3,219,236                            November 23, 1965

George E. Radcliffe

It is hereby certified that error appears in the above numbered patent requiring correction and that the said Letters Patent should read as corrected below.

Column 4, line 48, for "for carbonate" read -- of carbon --; column 6, line 16, for "regular" read -- regulator --

Signed and sealed this 18th day of October 1966.

(SEAL)
Attest:

ERNEST W. SWIDER
Attesting Officer

EDWARD J. BRENNER
Commissioner of Patents